(12) United States Patent
Takamatsu et al.

(10) Patent No.: US 7,338,003 B2
(45) Date of Patent: Mar. 4, 2008

(54) WEBBING TAKE-UP DEVICE

(75) Inventors: Hitoshi Takamatsu, Aichi-ken (JP);
Tomonori Nagata, Aichi-ken (JP);
Kazuhiko Aihara, Aichi-ken (JP);
Masaki Yasuda, Aichi-ken (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 345 days.

(21) Appl. No.: 11/097,278

(22) Filed: Apr. 4, 2005

(65) Prior Publication Data
US 2006/0163411 A1 Jul. 27, 2006

(30) Foreign Application Priority Data
Apr. 5, 2004 (JP) ............... 2004-111475

(51) Int. Cl.
*B65H 75/48* (2006.01)
(52) U.S. Cl. .............. 242/379.1; 280/806; 297/478
(58) Field of Classification Search ............ 242/379.1; 280/806; 297/478
See application file for complete search history.

(56) References Cited

U.S. PATENT DOCUMENTS

| 3,970,265 | A |   | 7/1976 | Köpke et al. |
| 5,887,814 | A | * | 3/1999 | Matsuki et al. ......... 242/379.1 |
| 5,964,428 | A | * | 10/1999 | Ogawa ................... 242/379.1 |
| 6,029,924 | A | * | 2/2000 | Ono et al. .............. 242/379.1 |
| 6,367,729 | B1 | * | 4/2002 | Inagawa et al. ........ 242/379.1 |
| 2004/0023904 | A1 |   | 2/2004 | Cowsert et al. |

FOREIGN PATENT DOCUMENTS

| DE | 101 11 906 A1 | 10/2001 |
| JP | 2001-233172 | 8/2001 |

OTHER PUBLICATIONS

European Search Report in related Foreign Patent Application No. EP 05 40 0011 dated Aug. 26, 2005.

* cited by examiner

*Primary Examiner*—Peter M. Cuomo
*Assistant Examiner*—Sang Kim
(74) *Attorney, Agent, or Firm*—Roberts, Mlotkowski & Hobbs; Thomas W. Cole

(57) ABSTRACT

A webbing take-up device is disclosed which includes a take-up shaft onto which a webbing is mound, and a mounting member nondetachably mounted to the take-up shaft by screw tightening. The take-up shaft and the mounting member are engaged with each other at a portion other than a portion where the screw tightening is carried out, thereby preventing relative rotation of the take-up shaft and the mounting member.

4 Claims, 2 Drawing Sheets

WEBBING TAKE-UP DEVICE

CROSS-REFERENCE TO RELATED APPLICATION

This application claims priority under 35 USC 119 from Japanese Patent Application No. 2004-111475, the disclosure of which is incorporated by reference herein.

BACKGROUND OF THE INVENTION

1. Field of the Invention

This invention relates to a webbing take-up device, and more particularly to a webbing take-up device wherein a mounting member is attached to a take-up shaft onto which a webbing is wound.

2. Description of the Related Art

Among conventional webbing take-up devices is one in which a torsion shaft is mounted to a spool onto which a webbing is wound, in a manner that prevents relative rotation between the torsion shaft and the spool (for example, refer to JP-A No. 2001-233172).

However, in such a webbing take-up device, it is arranged such that a torsion shaft is nondetachably mounted to a spool simply by a crimp member being crimped to (pressed into) an end of the torsion shaft. For this reason, it is desired that a torsion shaft be able to be strongly and nondetachably mounted to a spool.

SUMMARY OF THE INVENTION

In view of the above, the present invention has been made to provide a webbing take-up device wherein a mounting member can be strongly and nondetachably mounted to a take-up shaft and a webbing take-up device wherein a torsion shaft and a lock gear can be strongly and nondetachably mounted to a take-up shaft.

According to a first aspect of the present invention, a webbing take-up device is provided which includes a take-up shaft onto which a webbing is wound, and a mounting member nondetachably mounted to the take-up shaft by screw tightening.

According to a second aspect of the present invention, a webbing take-up device is provided which includes a take-up shaft onto which a webbing is wound, a torsion shaft disposed at a center axis portion of the take-up shaft, and a lock gear disposed at one end of the take-up shaft, wherein the torsion shaft and the lock gear are nondetachably mounted to the take-up shaft by screw tightening at one end side of the torsion shaft with the take-up shaft and the lock gear held between the screw tightening portion and other end side of the torsion shaft.

Other aspects, features and advantages of the present invention will become apparent from the following description taken in conjunction with the accompanying drawings.

DETAILED DESCRIPTION OF THE INVENTION

Figure 1:
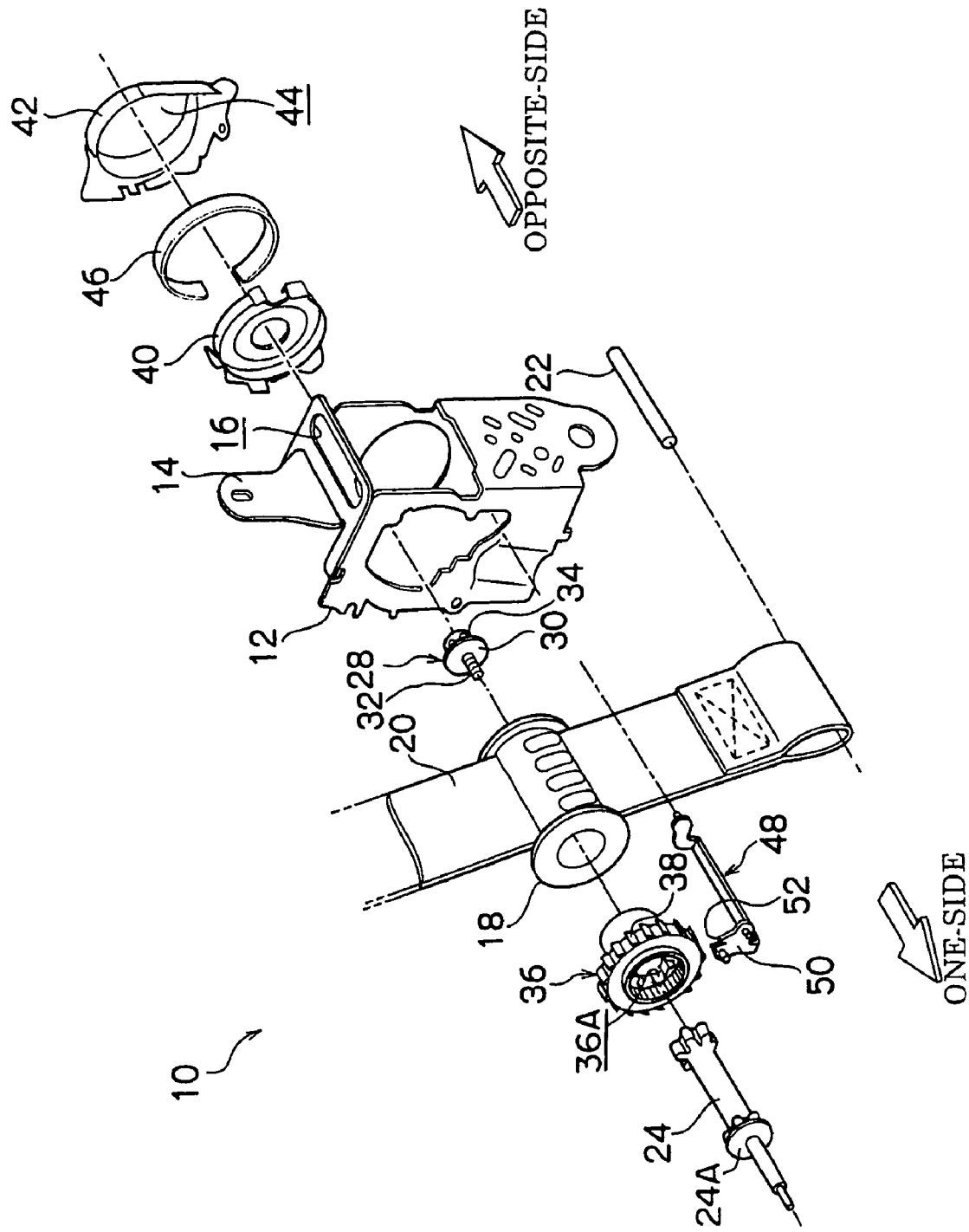
FIG. 1 is an exploded perspective view, as viewed from an oblique and upward direction, showing a main portion of the webbing take-up device according to an embodiment of the present invention.

FIG. 1 shows the main portion of a webbing take-up device 10 according to an embodiment of the present invention in an exploded perspective view as viewed from an obliquely upward direction.

Figure 2:
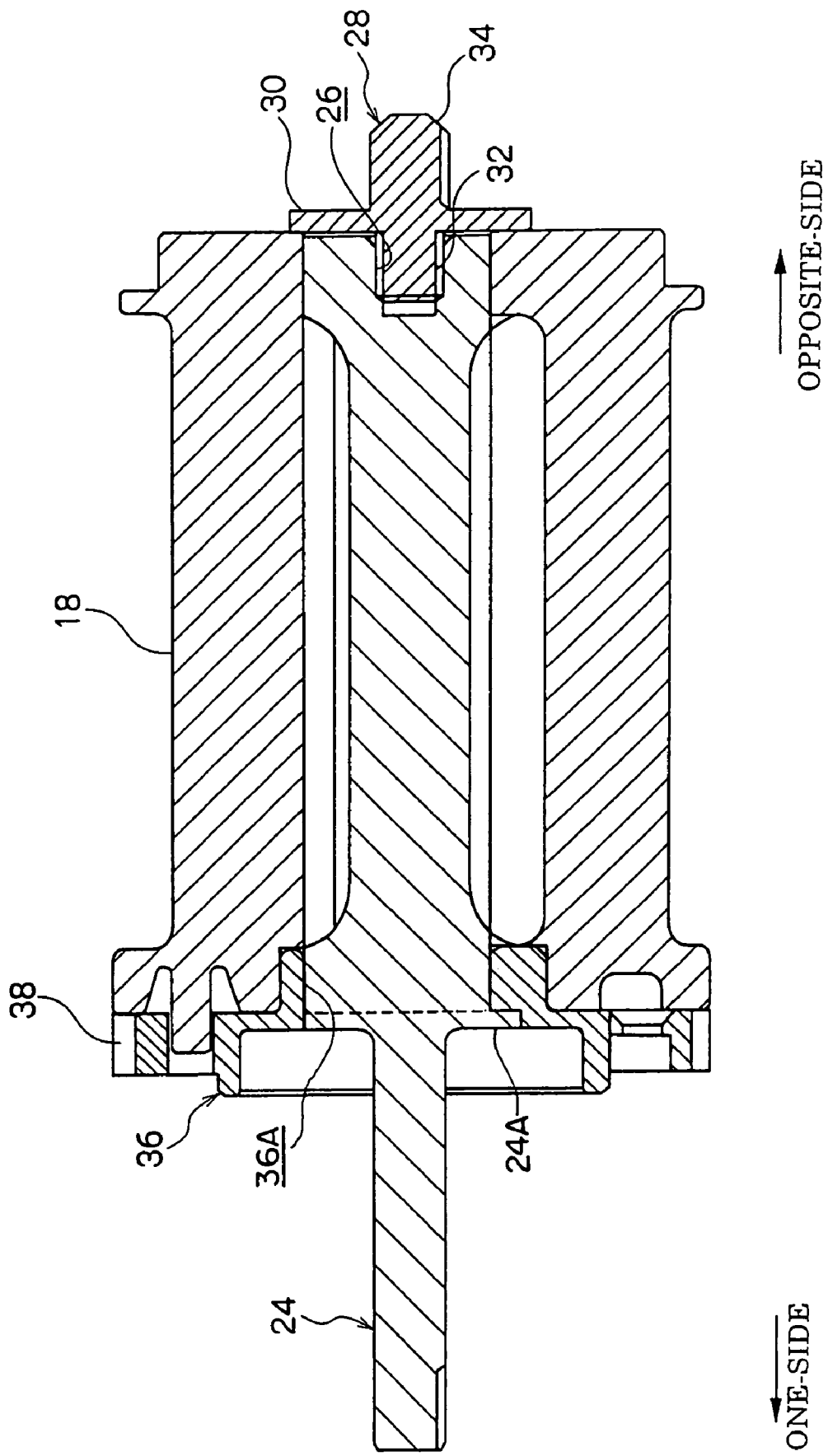
FIG. 2 is a sectional view showing in detail characteristic portions (spool, torsion shaft, screw member and lock gear) of the webbing take-up device shown in FIG. 1.

The webbing take-up device 10 includes a plate-like frame 12 having a substantially lateral U shape as viewed in a plan view. The frame 12 is secured in a vehicle interior. Between the upper end of a one-side wall and the upper end of an opposite-side wall of the frame 12 is bridged a connecting piece 14 which is formed with an insertion aperture 16 and adapted to be secured in a vehicle interior. The terms "one-side" and "opposite-side" used herein are defined as shown in FIGS. 1 and 2.

A spool 18, which serves as a take-up shaft and constitutes a force limiter mechanism, is rotatably supported between the one-side wall and the opposite-side wall of the frame 12. As shown in FIG. 2, the spool 18 is configured in a substantially cylindrical shape, and has alternate concave and convex portions provided on the outer circumference of an opening formed at an opposite-side end thereof.

An elongate belt-like webbing 20 is wound on the spool 18, and anchored to the spool 18 by virtue of the fact that a cylindrical shaft 22 attached to a base end of the webbing 20 is disposed in engagement with the spool 18 and because of the webbing 20 having a portion adjacent the opposite-side end thereof inserted through the spool 18. Further, the webbing 20, in the vicinity of its portion wound on the spool 18, is inserted through the insertion aperture 16, and adapted to be worn by a vehicle occupant. The spool 18 is arranged such that the webbing 20 is wound onto the spool when the spool is rotated in a take-up direction while the webbing 20 is unwound from the spool when the spool is rotated in a supply direction.

A torsion shaft 24 (an energy absorbing member), which constitutes a force limiter mechanism and serves as a mounting member, is disposed in a center axial portion of the spool 18. The torsion shaft 24 can be torsionally deformed in response to a torsional load equal to or greater than a predetermined one being applied thereto. The torsion shaft 24 is provided with alternate concave and convex portions on the outer circumference of an opposite-side end thereof as shown in FIG. 2, and the alternate concave and convex portions are engaged with the concave and convex portions provided on the outer circumference of the opening at the opposite-side end of the spool 18. Thus, the opposite-side end of the torsion shaft 24 is anchored to the opposite-side end of the spool 18 so that the torsion shaft 24 can be rotated together with the spool 18. Further, torsion shaft 24 is formed with a threaded aperture 26, which constitutes a member of a screwing portion, in a center axis portion of the opposite-side end thereof.

The torsion shaft 24 has a disc-like retaining piece 24A provided in the vicinity of the one-side end thereof and alternate concave and convex portions on the outer circumference of the opposite-side end thereof.

As shown in FIG. 2, the spool 18 is provided, at the opposite-side end thereof, with a screw member 28 which constitutes another member of the screwing portion. The screw member 28 is provided with a disk-like abutment piece 30 having a screw 32 provided integrally at the center of a one-side surface thereof. The screw 32 is screwed into the threaded aperture 26 formed in the opposite-side end of the torsion shaft 24, and thus the abutment piece 30 is disposed in contact with the opposite-side surface of the spool 18, thereby preventing the spool 18 from being moved toward the one-side of the torsion shaft 24. A substantially cylindrical fixation column piece 34 is integrally provided at the center of an opposite-side surface of the abutment piece 30.

On the one-side end of the spool 18 is provided a lock gear 36 which constitutes a force limiter mechanism and a mounting member. An engagement aperture 36A is formed in the center portion of the lock gear 36, and concave and convex portions are alternately provided on the outer circumference of the engagement aperture 36A.

As shown in FIG. 2, the lock gear 36 is secured, at the circumferential portion of the engagement aperture 36A, to the retaining piece 24A of the torsion shaft 24. Thus, the lock gear 36 is prevented from moving relative to the torsion shaft 24 toward the one-side end thereof. Further, the spool 18 and the lock gear 36 are held between the abutment piece 30 and the retaining piece 24A because of the screw 32 being screwed in the threaded aperture 26 (screw tightening), and thus the torsion shaft 24 and lock gear 36 are nondetachably mounted to the spool 18. Still further, the concave and convex portions on the outer circumference of the engagement aperture 36A of the lock gear 36 are engaged with the concave and convex portions provided on the outer circumference of the torsion shaft 24 on the opposite-side of the retaining piece 24A. Thus, the lock gear 36 is anchored in the vicinity of the one-side end of the torsion shaft 24 and prevented from rotating relative to the vicinity of the one-side end of the torsion shaft 24. Consequently, the lock gear 36 is permitted to rotate integrally with the torsion shaft 24 and the spool 18 except when the torsion shaft 24 is torsionally deformed. Ratchet teeth 38 are provided on the outer circumference of the lock gear 36.

A spring sheet 40 is mounted outside the one-side wall of the frame 12 in such a manner as to cover the opposite-side surface of the spool 18 with the fixation column piece 34 of the screw member 28 extended toward the opposite-side. Further, a spring cover 42 is mounted in such a manner as to cover the opposite-side portion of the spring sheet 40. The spring cover 42 includes a substantially cylindrical recess portion 44 which is open to the opposite-side.

A spiral spring 46 is provided as a biasing member in the recess portion 44 of the spring cover 42 with the outer end of the spiral spring 46 secured to the inner circumference of the recess portion 44 and the inner end of the spiral spring 46 secured to the fixation column piece 34 of the screw member 28. The spiral spring 46 biases the torsion shaft 24, spool 18 and lock gear 36 in the take-up direction via the screw member 28. Further, the spiral spring 46 also biases the spring member 28 in a direction that the screw 32 is screwed into the threaded aperture (screw-tightening direction).

A lock member 48 is bridged between the one-side wall and the opposite-side wall of the frame 12, and a lock plate 50 is provided on the one-side end of the lock member 48. The lock plate 50 is rotatably supported at one end thereof and located obliquely below the lock gear 36. A lock tooth 52 is provided on the other end of the lock plate 50. The lock plate 50 is located relative to the lock gear 36 in such a manner that the lock tooth 52 is prevented from engaging the ratchet teeth 38 of the lock gear 36.

When it is detected that the acceleration with which the webbing 20 is extended exceeds a predetermined value or when the vehicle is rapidly decelerated, the lock plate 50 of the lock member 48 is rotated toward the lock gear 36. As a result, an extending load is applied from the occupant to the webbing 20 so that a rotating force in the extending direction is applied to the spool 18, torsion shaft 24 and lock gear 36. In this manner, the lock tooth 52 of the lock plate 50 is engaged with the ratchet teeth 38 of the lock gear 36, thereby preventing the lock gear 36 from being rotated in the extending direction so that the webbing 20 is prevented from being extended.

Further, when the webbing 20 is prevented from being extended, if a torsional load applied from the occupant to the torsion shaft 24 via the webbing 20 and spool 18 exceeds a predetermined value, then the force limiter mechanism is actuated, and the torsion shaft 24 is torsionally deformed so that the spool 18 is rotated in the extending direction independently of the lock gear 36. Consequently, the webbing 20 is extended, and a load (energy) acting from the webbing 20 onto the occupant is absorbed.

The operation of the webbing take-up device 10 according to this embodiment of the present invention will now be described.

In the webbing take-up device 10 structured as described above, the torsion shaft 24 and lock gear 36 are mounted to the spool 18 onto which the webbing 20 is wound.

Here, by virtue of the fact that the spool 18 and lock gear 36 are held between the abutment piece 30 of the screw member 28 and the retaining piece 24A of the torsion shaft 24 because of the screw member 28 (screw 32) being screwed into the torsion shaft 24 (threaded aperture 26), the torsion shaft 24 and the lock gear 36 are strongly and nondetachably mounted to the spool 18.

Further, relative rotation between the torsion shaft 24 and lock gear 36 and the spool 18 is prevented because of the torsion shaft 24 and lock gear 36 being anchored to the spool 18 at the outer circumference of the opening at the opposite-side end of the spool 18 and at the outer circumference at the opposite-side end of the torsion shaft 24 (at portions except for the screw member 28 and threaded aperture 26). Thus, the relative rotational force between the torsion shaft 24 and lock gear 36 and the spool 18 can be prevented from acting directly on the screw member 28 and threaded aperture 26 so that the mounting of the torsion shaft 24 and lock gear 36 to the spool 18 can be prevented from being released due to the relative rotational force.

Still further, since the spiral spring 46 applying a biasing force in the take-up direction to the spool 18 is attached at the inner end thereof to the fixation column piece 34, the screw member 28 can also be used for the purpose of mounting the spiral spring 46.

Moreover, due to the biasing force of the spiral spring 46 in such a direction that the screw member 28 (screw 32) is screwed into the torsion shaft 24, t(threaded aperture 26), the mounting of the torsion shaft 24 and lock gear 36 to the spool 18 can be prevented from being released.

Although in the present embodiment, it is arranged such that both the torsion shaft 24 and the lock gear 36 are nondetachably mounted to the spool 18 by screwing, it is possible that only the torsion shaft 24 may be nondetachably mounted to the spool 18 by screwing, and it is also possible that only the lock gear 36 may be nondetachably mounted to the spool 18 by screwing.

Furthermore, although in the present embodiment, it is arranged such that both the torsion shaft 24 and the lock gear 36 are nondetachably mounted to the spool 18 by screwing the screw member 28 in the torsion shaft 24, it is also possible that either the torsion shaft 24 or the lock gear 36 may be nondetachably mounted to the spool 18 by screwing either the torsion shaft 24 or the lock gear 36 to the spool 18.

While the present invention has been illustrated and described with respect to specific embodiments thereof, it is to be understood that the present invention is by no means limited thereto and encompasses all changes and modifications which will become possible within the scope of the appended claims.

What is claimed is:

1. A webbing take-up device comprising:
   a rotatably supported take-up shaft onto which a webbing is wound, said take-up shaft having opposing ends;
   a torsion shaft disposed at a center axis portion of the take-up shaft and also having opposing ends; and
   a lock gear disposed at one end of the take-up shaft and being separate from and rotatable with respect to said take-up shaft,
   wherein said opposing ends of the torsion shaft are nondetachably and non-rotatably mounted to one end of the take-up shaft and said lock gear, respectively, by screw tightening at one end side of the torsion shaft with the take-up shaft and the lock gear held between a screw tightening portion and an end of the torsion shaft.

2. The webbing take-up device of claim 1, wherein said one end of said take-up shaft includes an integrally formed interference-type fitting that directly contacts a complementarily-shaped, integrally formed interference-type fitting at said one end of said torsion shaft.

3. The webbing take-up device of claim 1, wherein said screw tightening portion includes an abutment piece, and said end of said torsion shaft mounted to said lock gear includes an integrally formed retaining piece, and wherein said lock gear, torsion shaft and take-up shaft are captured between said abutment piece and said retaining piece.

4. A webbing take-up device comprising:
   a rotatably supported take-up shaft onto which a webbing is wound, said take-up shaft having opposing ends;
   a torsion shaft disposed at a center axis portion of the take-up shaft and also having opposing ends; and
   a lock gear disposed at one end of the take-up shaft and rotatably moveable with respect to said take-up shaft,
   wherein said opposing ends of the torsion shaft are nondetachably and non-rotatably mounted to one end of the take-up shaft and said lock gear, respectively, by screw tightening at one end side of the torsion shaft with the take-up shaft and the lock gear held between a screw tightening portion and an end of the torsion shaft, and
   wherein said one end of said take-up shaft includes an integrally formed interference-type fitting that directly contacts a complementarily-shaped, integrally formed interference-type fitting at said one end of said torsion shaft, and
   wherein said screw tightening portion includes an abutment piece, and said end of said torsion shaft mounted to said lock gear includes an integrally formed retaining piece, and wherein said lock gear, torsion shaft and take-up shaft are captured between said abutment piece and said retaining piece.

* * * * *